(12) United States Patent
Sumiya et al.

(10) Patent No.: US 8,297,900 B2
(45) Date of Patent: Oct. 30, 2012

(54) COMPOSITE MEMBER FIXING STRUCTURE

(75) Inventors: Yoshiaki Sumiya, Kariya (JP);
Hirotsugu Kojima, Kariya (JP); Kazuya Yoshijima, Okazaki (JP); Takahiro Yamazaki, Okazaki (JP)

(73) Assignees: Toyota Boshoku Kabushiki Kaisha, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 325 days.

(21) Appl. No.: 12/626,996

(22) Filed: Nov. 30, 2009

(65) Prior Publication Data

US 2010/0143074 A1 Jun. 10, 2010

(30) Foreign Application Priority Data

Dec. 9, 2008 (JP) ................. 2008-313629

(51) Int. Cl.
*F16B 35/00* (2006.01)
(52) U.S. Cl. .................. 411/369; 411/424; 403/408.1
(58) Field of Classification Search .................. 411/369, 411/399, 424; 403/408.1
See application file for complete search history.

(56) References Cited

U.S. PATENT DOCUMENTS

| | | | | |
|---|---|---|---|---|
| 1,631,410 | A * | 6/1927 | Fornaca | 123/90.22 |
| 4,797,022 | A * | 1/1989 | Crigger | 403/408.1 |
| 5,211,013 | A * | 5/1993 | Bonde et al. | 60/323 |
| 5,957,269 | A * | 9/1999 | Sahashi et al. | 200/296 |
| 6,148,787 | A * | 11/2000 | Takano | 123/195 A |
| 6,238,127 | B1 * | 5/2001 | Jhumra et al. | 403/282 |
| 6,257,188 | B1 * | 7/2001 | Fujii et al. | 123/90.38 |
| 7,845,322 | B2 | 12/2010 | Dunsch et al. | |
| 7,918,634 | B2 * | 4/2011 | Conrad et al. | 411/377 |
| 2008/0295796 | A1 | 12/2008 | Dunsch et al. | |
| 2009/0235892 | A1 | 9/2009 | Sumiya et al. | |
| 2009/0250883 | A1 | 10/2009 | Sumiya et al. | |

FOREIGN PATENT DOCUMENTS

| | | |
|---|---|---|
| DE | 202006011672 | 12/2007 |
| DE | 102007025129 | 12/2008 |
| EP | 1884629 | 2/2008 |
| JP | 2004-052705 | 2/2004 |
| JP | 2005-090485 | 4/2005 |
| JP | 2005-172197 | 6/2005 |
| JP | 2007-100657 | 4/2007 |
| JP | 2007-107479 | 4/2007 |

OTHER PUBLICATIONS

English language Abstract of JP 2007-107479, Apr. 26, 2007. English language Abstract of JP 2007-100657, Apr. 19, 2007.
Japan Office action, mail date is Jan. 11, 2011.

* cited by examiner

*Primary Examiner* — Flemming Saether
(74) *Attorney, Agent, or Firm* — Greenblum & Bernstein, P.L.C.

(57) ABSTRACT

A composite member 12, which is formed by integrating an OCV housing 14 and a cylinder head cover 13, is fixed to a cam cap 15 by a bolt 20. The bolt 20 is passed through a bolt insertion hole 16 of the composite member 12 and fastened to the cam cap 15. A step portion 20d is formed in a shank 20c between a head 20a and a threaded rod 20b of the bolt 20. A circumferential groove 21 is formed in the shank 20c between the step portion 20d and the head 20a of the bolt 20. The circumferential groove 21 extends along the outer circumferential surface of the shank 20c. An annular sealing member 22 is fitted in the groove 21. The threaded rod 20b of the bolt 20 is then screwed into the internal thread 19 of the cam cap 15, which is a coupled member. At this time, the step portion 20d of the bolt 20 contacts a contacting portion 16c in the bolt insertion hole 16 of the OCV housing 14. Also, the sealing member 22 contacts the inner circumferential surface of the bolt insertion hole 16 of the cylinder head cover 13.

5 Claims, 3 Drawing Sheets

COMPOSITE MEMBER FIXING STRUCTURE

BACKGROUND OF THE INVENTION

The present invention relates to a composite member fixing structure, and more particularly, to a fixing structure, for example, in a vehicle engine, which structure fixes a composite member, which includes a synthetic resin cylinder head cover and a metal housing of an oil control valve, to a coupled member such as a cam cap arranged on a cylinder head.

Conventionally, for example, Japanese Laid-Open Patent Publication No. 2007-107479 (first prior art) and Japanese Laid-Open Patent Publication No. 2007-100657 (second prior art) disclose this type of composite member fixing structure.

According to the fixing structure of the first prior art, a composite member is formed by insert molding a metal oil control valve housing (hereinafter, simply referred to as OCV housing) into a synthetic resin cylinder head cover. A bolt insertion hole is formed in the composite member, and an internal thread is formed in a cam cap on a cylinder head. Through the bolt insertion hole, a bolt is screwed into the internal thread, so that the composite member is fixed to the cam cap. On an outer circumferential surface of the composite member located outside of the bolt insertion hole, a groove is formed in a surface of the OCV housing that contacts the cylinder head cover. The groove extends along the outer circumferential surface of the OCV housing, and is filled with adhesive. When insert molding the composite member, resin flows into the groove so that the resin is adhered to the inside of the groove by the adhesive. Accordingly, the adhesive seals the gap between contacting surfaces of the cylinder head cover and the OCV housing.

According to the fixing structure of the second prior art, a composite member is formed by assembling a metal OCV housing to a synthetic resin cylinder head cover. The OCV housing includes a boss having a bolt insertion hole, and the cylinder head cover includes a cylindrical portion that is fitted about the outer circumferential surface of the boss. Through the bolt insertion hole, a bolt is screwed into an internal thread of a cam cap on the cylinder head, so that the composite member is fixed to the cam cap. An annular sealing member is provided between the outer circumferential surface of the proximal portion of the boss and the inner circumferential surface of the cylindrical portion. The sealing member is located on the outer circumferential surface of the boss, which has the bolt insertion hole, and seals the gap between the contacting surfaces of the cylinder head cover and the OCV housing.

The fixing structures of these prior arts have the following drawbacks.

According to the fixing structure of the first prior art, the insert molding of the composite member is performed with the groove on the OCV housing filled with the adhesive. Therefore, when molding the composite member in a mold, the flowing pressure of synthetic resin injected into the mold is likely to cause the adhesive to leak from the groove. In such cases, it is difficult to obtain a desired sealing. In addition, adhesive that leaks out from the groove reaches the outer surface of the cylinder head cover, and contaminates the outer surface. In other cases, adhesive that leaks at the molding contaminates the molding surface of the mold.

According to the fixing structure of the second prior art, the cylinder head cover and the OCV housing of the composite member are assembled together in a process after molding. The assembly requires a process for placing a sealing member between the contacting surfaces of the cylinder head cover and the OCV housing. This makes the assembling procedure troublesome and time consuming.

In each of the fixing structures of the first and second prior arts, sealing is provided on the outer circumferential surface of the boss, which has a bolt insertion hole, and between the contacting surfaces of the cylinder head cover and the OCV housing. However, no sealing is provided between the inner circumferential surface of the bolt insertion hole and the outer circumferential surface of the bolt shank. Therefore, oil leak easily occurs through the gap between the inner circumferential surface of the bolt insertion hole and the outer circumferential surface of the bolt shank.

SUMMARY OF THE INVENTION

Accordingly, it is an objective of the present invention to provide a composite member fixing structure that is capable of simplifying the assembly and properly sealing a portion fixed by a bolt.

To achieve the foregoing objective and in accordance with one aspect of the present invention, a composite member fixing structure for fixing a composite member made of integrated resin member and metal member to a coupled member is provided. The composite member has an insertion hole. A contacting portion is formed in a region of the insertion hole that is made of the metal member. The coupled member has an internal thread. The composite member fixing structure includes a bolt and an annular sealing member. The bolt is inserted into the insertion hole and fastened to the internal thread of the coupled member. The bolt includes a head, a shank extending from the head, a threaded rod that extends from the shank and is screwed into the internal thread of the coupled member, and a step portion formed in the shank. The annular sealing member is located between the step portion of the bolt and the head. With the threaded rod of the bolt being screwed into the internal thread of the coupled member, the step portion is caused to contact the contacting portion, and the sealing member is located between the bolt and the resin member of the composite member.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Embodiments of the present invention will now be described with reference to the drawings.

First Embodiment

A composite member fixing structure according to a first embodiment will now be described with reference to FIGS. 1 to 3.

Figure 1:
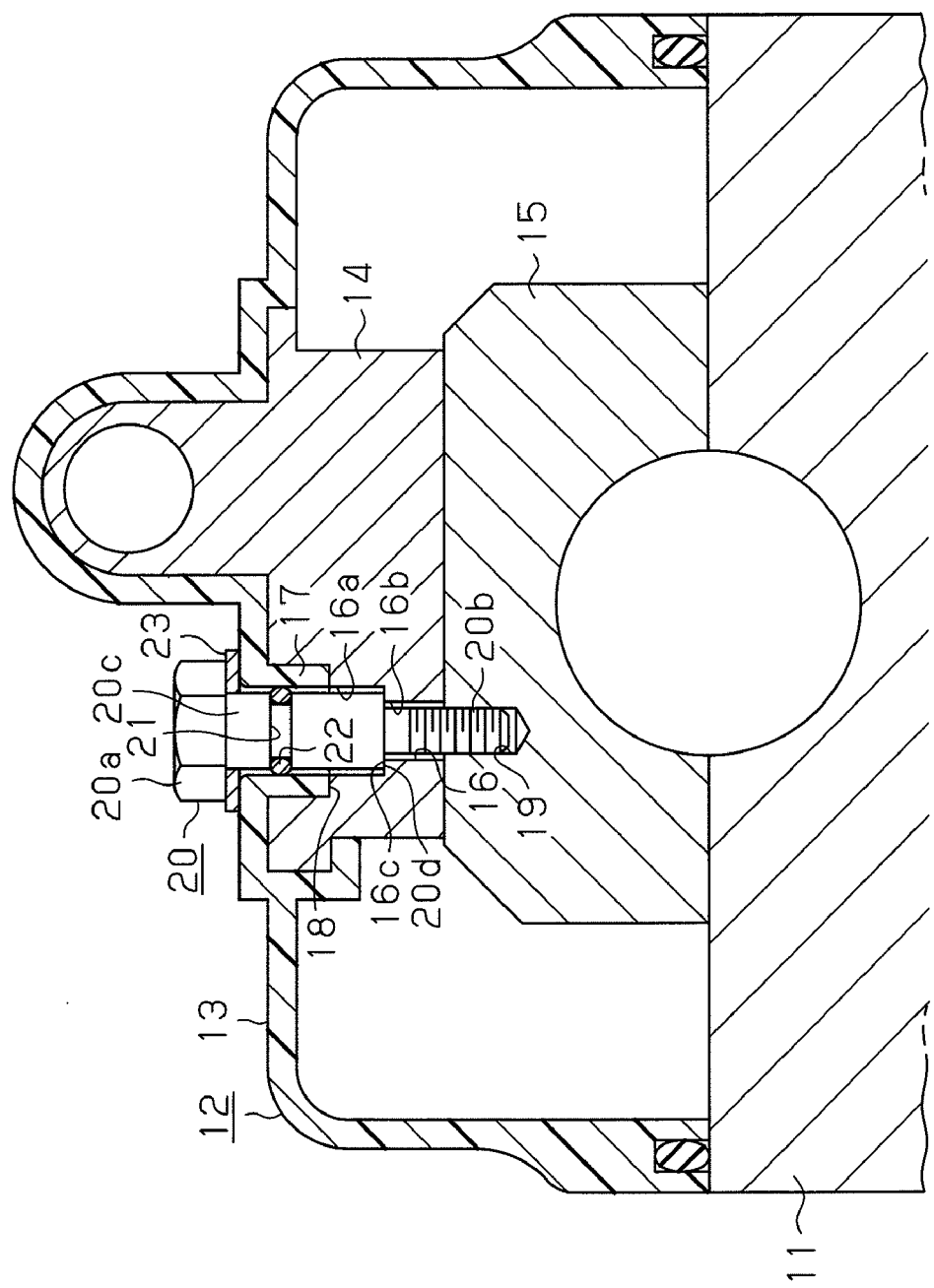
FIG. 1 is a partial cross-sectional view illustrating a fixing structure according to a first embodiment of the present invention, which structure is applied to a composite member and a cam cap in a vehicle engine.
Figure 2:
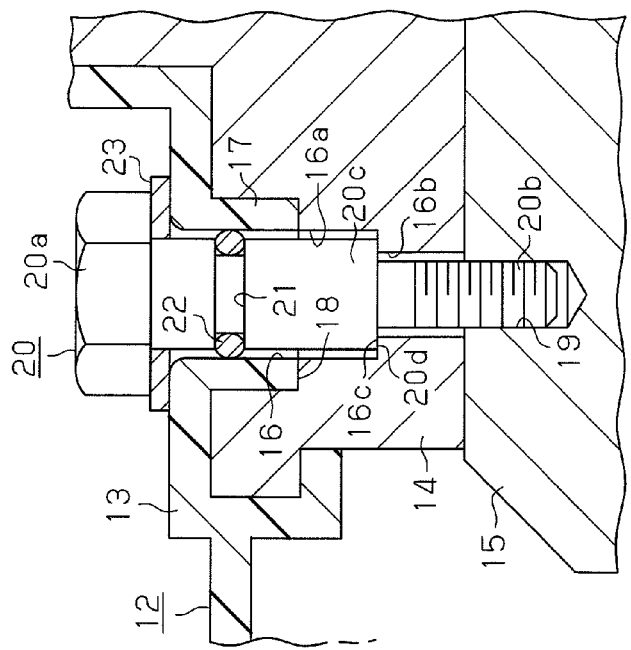
FIG. 2 is an enlarged cross-sectional view illustrating a part of FIG. 1.

As shown in FIG. 1, in a vehicle engine, a composite member 12 is fixed onto a cylinder head 11, which is made of metal such as an aluminum alloy, using a plurality of bolts (not shown). The composite member 12 has a composite structure in which a housing 14 of an oil control valve (hereinafter, simply referred to as OCV housing), which is a metal member, is integrated with a cylinder head cover 13, which is a resin member, by insert molding. The cylinder head cover 13 is made of synthetic resin such as a polyamide resin. The OCV housing 14 is made of metal such as an aluminum alloy. In the composite member 12, a cam cap 15, which is a coupled member made of metal such as an aluminum alloy, is fixed to the upper surface of the cylinder head 11.

A vertically extending bolt insertion hole 16 is formed through the cylinder head cover 13 and the OCV housing 14 of the composite member 12. The bolt insertion hole 16 includes a large diameter portion 16a, which is formed in a region close to the outer opening, a small diameter portion 16b, which is formed in a region close to the inner opening, and a contacting portion 16c, which is formed between the large diameter portion 16a and the small diameter portion 16b. The cylinder head cover 13, which is made of synthetic resin, has a cylindrical portion 17 that forms an upper portion of the large diameter portion 16a. The cylindrical portion 17 is formed to extend from the outer opening of the bolt insertion hole 16 to the vicinity of a middle portion of the large diameter portion 16a. At the periphery of the lower end of the cylindrical portion 17, contacting surfaces 18 between the cylindrical portion 17, which is made of synthetic resin, and the OCV housing 14, which is made of metal, are located in the vicinity of the middle portion of the large diameter portion 16a of the bolt insertion hole 16. The contacting portion 16c of the bolt insertion hole 16 is formed to be located inside the metal OCV housing 14. The periphery of the upper opening of the large diameter portion 16a is formed to have an arcuate cross section so that no sharp edge is formed.

An internal thread 19 is formed in the cam cap 15 to correspond to the bolt insertion hole 16. A bolt 20 is inserted through the bolt insertion hole 16 from the outside of the composite member 12, and screwed into the internal thread 19.

The bolt 20 has a head 20a at the proximal end, a small diameter threaded rod 20b at the distal end, and a shank 20c, which is located between the head 20a and the threaded rod 20b and has a larger diameter than the threaded rod 20b. A step portion 20d is formed at the boundary between the shank 20c and the threaded rod 20b. The step portion 20d is contactable with the contacting portion 16c of the bolt insertion hole 16. A circumferential groove 21 is formed in and extends along the outer circumferential surface of the shank 20c. An annular sealing member (seal ring) 22 is fitted in the circumferential groove 21. The sealing member 22 is contactable with the inner circumferential surface of the cylindrical portion 17 in the bolt insertion hole 16. A washer 23 is provided between the head 20a of the bolt 20 and the outer surface of the composite member 12.

An operation of the composite member fixing structure according to the first embodiment, which is constructed as described above, will hereafter be described.

Figure 3:
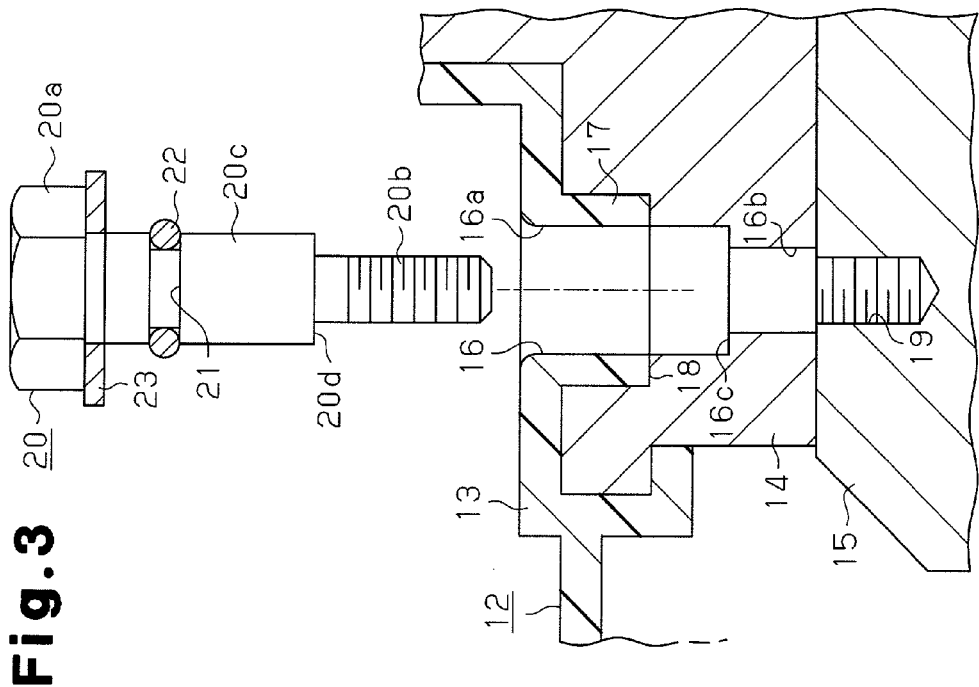
FIG. 3 is a cross-sectional view illustrating a disassembled state of the bolt shown in FIG. 2.

When fixing the composite member 12 to the cam cap 15 on the cylinder head 11, the sealing member 22 is first fitted in the circumferential groove 21 of the bolt 20 as shown in FIG. 3. In this state, the bolt 20 is inserted into the bolt insertion hole 16 of the composite member 12. The threaded rod 20b of the bolt 20 is then screwed into the internal thread 19 of the cam cap 15. Then, as shown in FIG. 2, the step portion 20d of the bolt 20 contacts the contacting portion 16c of the bolt insertion hole 16 in the OCV housing 14, so that the contacting portion 16c is pressed. Accordingly, the OCV housing 14 of the composite member 12 is fastened and fixed to the cam cap 15.

At this time, the outer circumferential surface of the sealing member 22 in the circumferential groove 21 of the bolt 20 contacts the inner circumferential surface of the cylindrical portion 17 in the bolt insertion hole 16. This contact seals the boundary between the inner circumferential surface of the bolt insertion hole 16 and the outer circumferential surface of the shank 20c of the bolt 20, in the vicinity of the outer opening of the bolt insertion hole 16. That is, the sealing member 22 seals the boundary between the bolt 20 and the cylindrical portion 17 at a position in the bolt insertion hole 16 that is closer to the outer opening of the bolt insertion hole 16 than to the contacting surfaces 18 between the cylinder head cover 13, which is made of synthetic resin, and the OCV housing 14, which is made of metal.

Therefore, even if oil in the cylinder head cover 13 leaks into the bolt insertion hole 16 through the gap between the cam cap 15 and the OCV housing 14 or through the gap between the OCV housing 14 and the cylinder head cover 13, the leaked oil is prevented from leaking by the sealing member 22. Thus, oil does not leak out of the cylinder head cover 13.

Accordingly, the composite member fixing structure according to the first embodiment has the following advantages.

(1) Fastening the bolt 20 not only fixes the composite member 12 and the cam cap 15 to each other, but also, simultaneously seals the gap between the bolt 20 and the cylinder head cover 13. The cylinder head cover 13 is therefore easily and efficiently assembled.

(2) The sealing member 22 seals the boundary between the inner circumferential surface of the bolt insertion hole 16 and the outer circumferential surface of the shank 20c of the bolt 20 at a position in the bolt insertion hole 16 that is closer to the outer opening of the bolt insertion hole 16 than to the contacting surfaces 18 between the cylinder head cover 13 and the OCV housing 14. Thus, oil leak through the boundary between the inner circumferential surface of the bolt insertion hole 16 and the outer circumferential surface of the shank 20c of the bolt 20 and oil leak through the contacting surfaces 18 between the cylinder head cover 13 and the OCV housing 14 in the bolt insertion hole 16 are reliably prevented. Further, unlike the first prior art, no adhesive for sealing is used. Therefore, insufficient sealing and contamination that accompany the leak of the adhesive are not caused.

(3) The circumferential groove 21 is formed in the shank 20c of the bolt 20, and the sealing member 22 is fitted in the circumferential groove 21. This prevents the sealing member 22 from being displaced from a prescribed position, and allows the sealing member 22 to be reliably pressed against the inner circumferential surface of the bolt insertion hole 16 so that the sealing member 22 provides sealing.

(4) The washer 23, which is located between the head 20a of the bolt 20 and the outer circumferential surface of the cylinder head cover 13, prevents the bolt 20 from being loosened by engine vibrations. As a result, the fixed state of the cylinder head cover 13 is maintained.

(5) The peripheral edge of the opening of the bolt insertion hole 16 is formed to have an arcuate cross section. This prevents the sealing member 22 from being damaged by contacting the opening when the bolt 20 is inserted into the bolt insertion hole 16.

Second Embodiment

Figure 4:
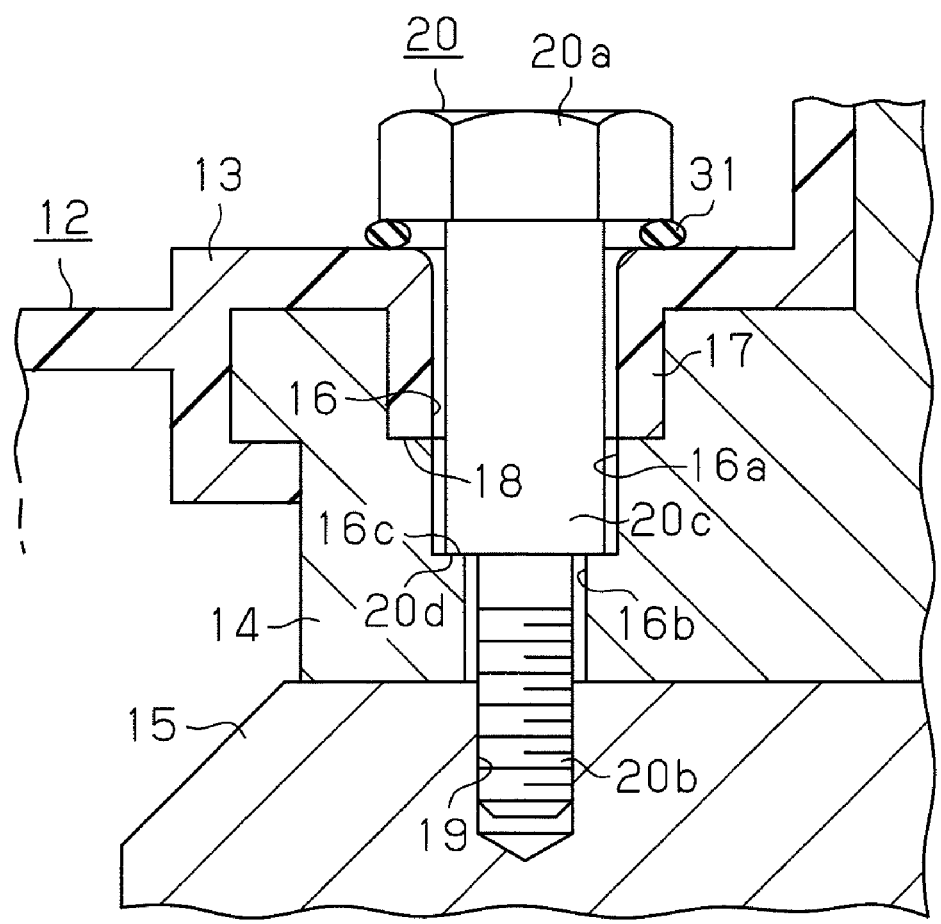
FIG. 4 is a partial cross-sectional view illustrating a composite member fixing structure according to a second embodiment of the present invention.

Next, a second embodiment of the present invention will be described with reference to FIG. 4. The differences from the first embodiment will mainly be discussed below.

In the second embodiment, an annular sealing member 31 is located between the head 20a of the bolt 20 and the upper surface of the cylinder head cover 13. Therefore, in addition to the sealing function, the sealing member 31 has a function as a washer.

The second embodiment thus has the following advantage.

(6) Since the sealing member 31 also functions as a washer, there is no need to provide a washer. As a result, the number of the components required for the fixing structure is reduced, which simplifies the fixing structure.

(Modifications)

It should be noted that the embodiments shown above may be modified as follows.

In the second embodiment, a circumferential groove 21 may be formed in the shank 20c of the bolt 20, and a sealing member 22 may be fitted in the circumferential groove 21 as in the first embodiment. In short, the sealing members 22, 31 may be provided at two positions, or in the circumferential groove 21 and at the head 20a of the bolt 20.

The composite member fixing structure of the present invention may be used in a part different from those in the first and second embodiments. For example, the present invention may be employed as a structure for fixing an oil pan, which is formed by a composite member of a synthetic resin plate and a metal plate, to the lower surface of a cylinder block. Also, the present invention may be employed in a structure for fixing a composite member that covers a power transmission path between a crankshaft and a camshaft to a side surface of a cylinder block. Further, the present invention may be employed as a structure for fixing a composite member as an oil housing to the housing of a transmission.

Therefore, the present examples and embodiments are to be considered as illustrative and not restrictive and the invention is not to be limited to the details given herein, but may be modified within the scope and equivalence of the appended claims.

What is claimed is:

1. A composite member fixing structure for fixing a composite member made of an integrated resin member and a metal member to a coupled member, the composite member having an insertion hole having an inner circumferential surface, a contacting portion is provided in a region of the insertion hole that is made of the metal member, the coupled member having an internal thread, the composite member fixing structure comprising:
   a bolt insertable into the insertion hole and fastened to the internal thread of the coupled member, wherein the bolt includes a head, a shank extending from the head, a threaded rod that extends from the shank and mated with the internal thread of the coupled member, and a step portion provided at the shank; and
   an annular sealing member located between the step portion of the bolt and the head,
   wherein, with the threaded rod of the bolt being mated with the internal thread of the coupled member, the step portion contacts the contacting portion, and the sealing member is located between the bolt and the resin member of the composite member,
   wherein the shank of the bolt has an outer circumferential surface,
   wherein a circumferential groove is provided at and extends along the outer circumferential surface of the shank, the annular sealing member disposed in the circumferential groove, and
   wherein the sealing member is located between the shank of the bolt and the inner circumferential surface of the insertion hole.

2. The composite member fixing structure according to claim 1, wherein the resin member of the composite member has an outer surface, the composite member fixing structure further comprising a washer located between the head of the bolt and the outer surface of the resin member.

3. The composite member fixing structure according to claim 1, wherein the insertion hole has an opening with a periphery, and the periphery has an arcuate cross section.

4. The composite member fixing structure according to claim 1, wherein an outer diameter of the shank is greater than an outer diameter of the threaded rod, and wherein the step portion is disposed at a boundary between the shank and the threaded rod.

5. The composite member fixing structure according to claim 1, wherein the resin member is a cylinder head cover, and the metal member is a housing of an oil control valve fixed to the cylinder head cover, and the coupled member is a cam cap fixed to the cylinder head.

* * * * *